US012662125B2

(12) United States Patent
Al-Stouhi et al.

(10) Patent No.: US 12,662,125 B2
(45) Date of Patent: Jun. 23, 2026

(54) SYSTEMS AND METHODS FOR IDENTIFYING INTERSECTIONS AND CONTROLLING VEHICLES AT INTERSECTIONS

(71) Applicant: Honda Motor Co., Ltd., Tokyo (JP)

(72) Inventors: Samir K. Al-Stouhi, Dearborn, MI (US); Paritosh S. Kelkar, Sunnyvale, CA (US)

(73) Assignee: HONDA MOTOR CO., LTD, Tokyo (JP)

( * ) Notice: Subject to any disclaimer, the term of this patent is extended or adjusted under 35 U.S.C. 154(b) by 300 days.

(21) Appl. No.: 18/193,119

(22) Filed: Mar. 30, 2023

(65) Prior Publication Data

US 2024/0326814 A1     Oct. 3, 2024

(51) Int. Cl.
  *B60W 30/00*      (2006.01)
  *B60W 30/18*      (2012.01)
       (Continued)
(52) U.S. Cl.
  CPC .... *B60W 30/18154* (2013.01); *B60W 60/001* (2020.02); *B60W 30/09* (2013.01);
       (Continued)
(58) Field of Classification Search
  CPC ......... B60W 30/18154; B60W 60/001; B60W 30/09; B60W 30/18109; B60W 2420/40;
       (Continued)

(56) References Cited

U.S. PATENT DOCUMENTS 9,534,910 B2    1/2017  Okumura
2020/0168097 A1*  5/2020  Kumano ................ G08G 1/166
       (Continued)

FOREIGN PATENT DOCUMENTS

CN       109186621 A  *  1/2019  ............. G01C 21/34
CN       115290106 A  *  11/2022  ............. G01C 21/34
EP        4148686 A1    3/2023

OTHER PUBLICATIONS

U. Baumann, Y.-Y. Huang, C. Glaser, M. Herman, H. Banzhaf and J. M. Zollner, "Classifying Road Intersections using Transfer-Learning on a Deep Neural Network," 2018 21st International Conference on Intelligent Transportation Systems (ITSC), Maui, HI, USA, 2018, pp. 683-690 (Year: 2018).*

*Primary Examiner* — Russell Frejd
*Assistant Examiner* — Brittany Renee Peko
(74) *Attorney, Agent, or Firm* — Armstrong Teasdale LLP

(57) ABSTRACT

A vehicle is provided. The vehicle includes a plurality of sensors. The vehicle also includes a vehicle controller. The vehicle controller is programmed to collect first sensor information from at least the first sensor during operation of a vehicle, ii) apply the first sensor information to an intersection classification model to determine a type of intersection that the vehicle is approaching, iii) collect second sensor information from the at least the second sensor during vehicle operation, and iv) apply the second sensor information to an intersection specific model to determine at least one course of action for the vehicle to execute, wherein the intersection specific model is associated with the type of intersection determined by the intersection classification model.

17 Claims, 7 Drawing Sheets

(51) Int. Cl.
B60W 60/00 (2020.01)
*B60W 30/09* (2012.01)

(52) U.S. Cl.
CPC ... *B60W 30/18109* (2013.01); *B60W 2420/40* (2013.01); *B60W 2420/403* (2013.01); *B60W 2420/408* (2024.01); *B60W 2420/50* (2013.01); *B60W 2420/54* (2013.01); *B60W 2552/53* (2020.02); *B60W 2556/10* (2020.02)

(58) Field of Classification Search
CPC ..... B60W 2420/403; B60W 2420/408; B60W 2420/50; B60W 2420/54; B60W 2552/53; B60W 2556/10; B60W 2710/18; B60W 2710/20; B60W 2720/106; B60W 30/18159; B60W 40/04
See application file for complete search history.

(56) References Cited

U.S. PATENT DOCUMENTS

| | | | |
|---|---|---|---|
| 2020/0346666 A1* | 11/2020 | Wray | B60W 60/0025 |
| 2021/0303882 A1 | 9/2021 | Mallela et al. | |
| 2021/0380108 A1* | 12/2021 | Iihoshi | B60W 50/0097 |
| 2022/0314999 A1 | 10/2022 | Williams et al. | |
| 2024/0101118 A1* | 3/2024 | Sajjadi Mohammadabadi | B60W 30/18154 |
| 2024/0194058 A1* | 6/2024 | Monninger | G08G 1/0133 |

* cited by examiner

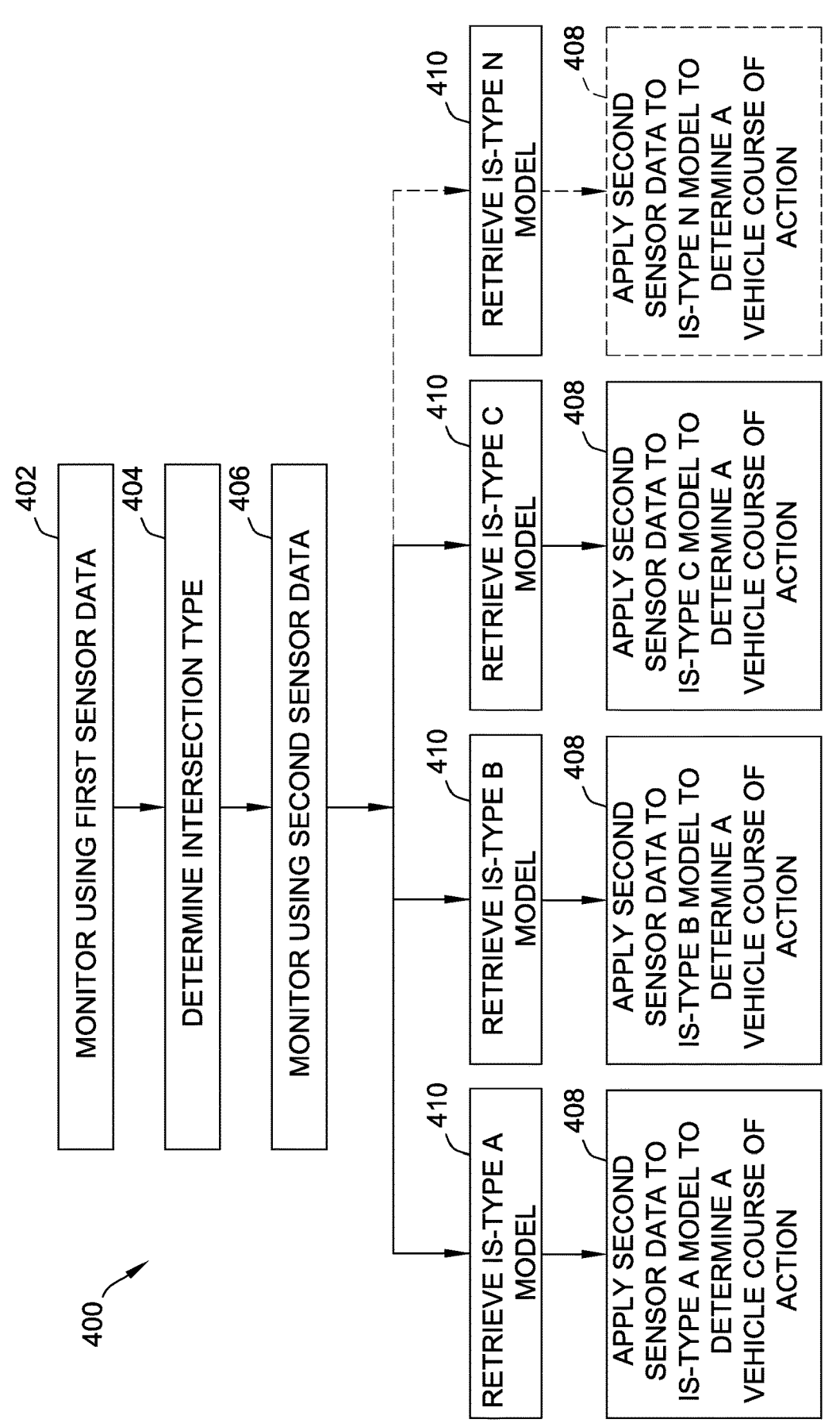

402 MONITOR USING FIRST SENSOR DATA

404 DETERMINE INTERSECTION TYPE

406 MONITOR USING SECOND SENSOR DATA

410 RETRIEVE IS-TYPE A MODEL

408 APPLY SECOND SENSOR DATA TO IS-TYPE A MODEL TO DETERMINE A VEHICLE COURSE OF ACTION

410 RETRIEVE IS-TYPE B MODEL

408 APPLY SECOND SENSOR DATA TO IS-TYPE B MODEL TO DETERMINE A VEHICLE COURSE OF ACTION

410 RETRIEVE IS-TYPE C MODEL

408 APPLY SECOND SENSOR DATA TO IS-TYPE C MODEL TO DETERMINE A VEHICLE COURSE OF ACTION

410 RETRIEVE IS-TYPE N MODEL

408 APPLY SECOND SENSOR DATA TO IS-TYPE N MODEL TO DETERMINE A VEHICLE COURSE OF ACTION

SYSTEMS AND METHODS FOR IDENTIFYING INTERSECTIONS AND CONTROLLING VEHICLES AT INTERSECTIONS

FIELD OF THE INVENTION

The present disclosure relates to vehicular control and navigation and, more particularly, to systems and methods for determining an intersection type and controlling a vehicle traversing an intersection of the determined intersection type.

BACKGROUND

Automated and semi-automated vehicles have become more widespread necessitating improvements in the accuracy and speed in which one or more automatic controls are determined and executed by the vehicle. Complexity of traffic intersections, e.g., merging of multiple roads, multi-directional traffic flows, and/or traffic signals, presents additional challenges when determining real-time controls for automated and semi-automated vehicles. Furthermore, traffic intersections may create potentially hazardous and collision-prone conditions as multiple vehicles may converge and approach the intersection from various directions. Accordingly, precise vehicle controls need to be determined quickly and efficiently to facilitate enhancing the safety and reliability of the automated and semi-automated vehicle navigating through the intersection.

Known traffic intersections have a wide range of configurations. For example, known intersections may include traffic lights, or stop/yield signs used to control the flow of traffic from a plurality of merging roads that each have a varying number of lanes, which may include dedicated turn lanes and that each merge into the intersection from its own direction and at its own angle relative to the intersection. Determined vehicle controls must be suitable for the vehicle to perform at the specific configuration of the traffic intersection. For example, each intersection configuration may include multiple available routes, and/or traffic restrictions that the vehicle must adhere to as the automated and semi-automated vehicle traverses the intersection.

Accordingly, it is desirable to have systems and methods that determine vehicle controls, for example, in a manner that facilitates generating optimal and/or more efficient vehicle travel path routes through traffic intersections, while simultaneously improving the computational efficiency and speed at which these vehicle controls are determined.

BRIEF SUMMARY

In one aspect, a vehicle including a plurality of sensors including at least a first sensor and at least a second sensor and a vehicle controller is provided. The vehicle controller is programmed to collect first sensor information from at least the first sensor during operation of a vehicle and apply the first sensor information to an intersection classification model to determine a type of intersection that the vehicle is approaching. The vehicle controller is further programmed to collect second sensor information from the at least the second sensor during vehicle operation and apply the second sensor information to an intersection specific model to determine at least one course of action for the vehicle to execute. The intersection specific model is associated with the type of intersection determined by the intersection classification model.

In another aspect, a system for controlling a vehicle including a computer device including at least one memory and at least one processor in communication with the at least one memory is provided. The at least one processor programmed to collect first sensor information from at least the first sensor during operation of a vehicle and apply the first sensor information to an intersection classification model to determine a type of intersection that the vehicle is approaching. The processor is further programmed to collect second sensor information from the at least the second sensor during vehicle operation and apply the second sensor information to an intersection specific model to determine at least one course of action for the vehicle to execute. The intersection specific model is associated with the type of intersection determined by the intersection classification model.

In still another aspect, a method for controlling a vehicle using a vehicle controller associated with the vehicle is provided. The method includes collecting first sensor information from at least a first sensor during operation of a vehicle and applying the first sensor information to an intersection classification model to determine a type of intersection that the vehicle is approaching. The method further includes collecting second sensor information from at least a second sensor during vehicle operation and applying the second sensor information to an intersection specific model to determine at least one course of action for the vehicle to execute. The intersection specific model is associated with the type of intersection type determined by the intersection classification model.

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of the systems and methods disclosed therein. It should be understood that each Figure depicts an exemplary embodiment of a particular aspect of the disclosed systems and methods, and that each of the Figures is intended to accord with a possible embodiment thereof. Further, wherever possible, the following description refers to the reference numerals included in the following Figures, in which features depicted in multiple Figures are designated with consistent reference numerals.

There are shown in the drawings arrangements which are presently discussed, it being understood, however, that the present embodiments are not limited to the precise arrangements and are instrumentalities shown, wherein:

FIG. 4 illustrates a flowchart of an exemplary process that may be implemented to determine one or more courses of action for the vehicle shown in FIG. 1 to perform at an identified intersection type.

Figure 1:
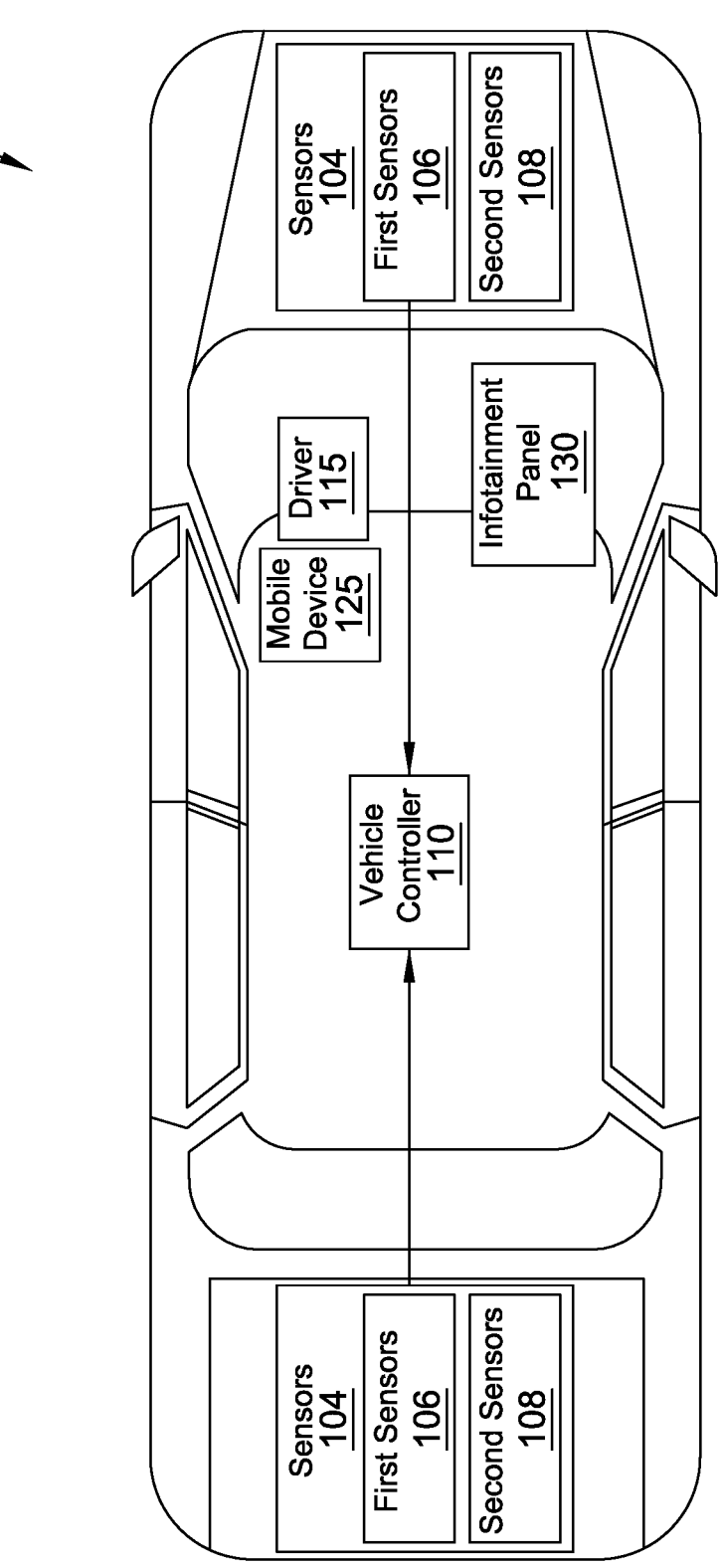
FIG. 1 illustrates a schematic diagram of an exemplary vehicle.

The Figures depict preferred embodiments for purposes of illustration only. One skilled in the art will readily recognize from the following discussion that alternative embodiments of the systems and methods illustrated herein may be employed without departing from the principles of the invention described herein.

DETAILED DESCRIPTION OF THE DRAWINGS

In the following specification and the claims, reference will be made to a number of terms, which shall be defined to have the following meanings.

The singular forms "a," "an," and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

As used herein, the term "database" may refer to either a body of data, a relational database management system (RDBMS), or to both, and may include a collection of data including hierarchical databases, relational databases, flat file databases, object-relational databases, object oriented databases, and/or another structured collection of records or data that is stored in a computer system. The above examples are not intended to limit in any way the definition and/or meaning of the term database. Examples of RDBMS's include, but are not limited to, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, California; IBM is a registered trademark of International Business Machines Corporation, Armonk, New York; Microsoft is a registered trademark of Microsoft Corporation, Redmond, Washington; and Sybase is a registered trademark of Sybase, Dublin, California.)

A computer program of one embodiment is embodied on a computer-readable medium. In an example, the system is executed on a single computer system, without requiring a connection to a server computer. In a further example embodiment, the system is being run in a Windows® environment (Windows is a registered trademark of Microsoft Corporation, Redmond, Washington). In yet another embodiment, the system is run on a mainframe environment and a UNIX® server environment (UNIX is a registered trademark of X/Open Company Limited located in Reading. Berkshire, United Kingdom). In a further embodiment, the system is run on an iOS® environment (iOS is a registered trademark of Cisco Systems, Inc. located in San Jose, CA). In yet a further embodiment, the system is run on a Mac OS® environment (Mac OS is a registered trademark of Apple Inc. located in Cupertino, CA). In still yet a further embodiment, the system is run on Android® OS (Android is a registered trademark of Google, Inc. of Mountain View, CA). In another embodiment, the system is run on Linux® OS (Linux is a registered trademark of Linus Torvalds of Boston, MA). The application is flexible and designed to run in various different environments without compromising any major functionality. In some embodiments, the system includes multiple components distributed among a plurality of computer devices. One or more components are in the form of computer-executable instructions embodied in a computer-readable medium. The systems and processes are not limited to the specific embodiments described herein. In addition, components of each system and each process can be practiced independently and separately from other components and processes described herein. Each component and process can also be used in combination with other assembly packages and processes.

As used herein, the terms "processor" and "computer" and related terms, e.g., "processing device," "computer device," and "controller" are not limited to just those integrated circuits referred to in the art as a computer, but broadly refers to a microcontroller, a microcomputer, a programmable logic controller (PLC), an application specific integrated circuit (ASIC), and other programmable circuits, and these terms are used interchangeably herein. In the embodiments described herein, memory may include, but is not limited to, a computer-readable medium, such as a random-access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

Further, as used herein, the terms "software" and "firmware" are interchangeable and include any computer program storage in memory for execution by personal computers, workstations, clients, servers, and respective processing elements thereof.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device, and a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

Furthermore, as used herein, the term "real-time" refers to at least one of the time of occurrence of the associated events, the time of measurement and collection of predetermined data, the time for a computer device (e.g., a processor) to process the data, and the time of a system response to the events and the environment. In the embodiments described herein, these activities and events may be considered to occur substantially instantaneously.

The present embodiments may relate to, inter alia, systems and methods that may be implemented to control a vehicle travelling through an intersection based upon sensor data received in real-time. In an exemplary embodiment, the process is performed by a vehicle control system, also known as a vehicle controller.

In the exemplary embodiment, the vehicle includes a plurality of sensors that enable the vehicle to observe its surroundings in real-time. The sensors can include, but are not limited to only including, radar, LIDAR, proximity sensors, ultrasonic sensors, electromagnetic sensors, wide RADAR, long distance RADAR, Global Positioning System (GPS), video devices, imaging devices, cameras, audio recorders, and computer vision. The vehicle controller receives sensor data from the sensors.

In one embodiment, based on the information from the sensors, the vehicle controller determines that the vehicle is approaching an intersection. As the vehicle approaches the intersection, the vehicle controller performs one or more processes to determine and/or identify an intersection type of the approaching intersection. Subsequently, after the intersection type has been identified, the controller performs one or more subsequent processes, based on the identified intersection type, to determine one or more courses of action for the vehicle to perform at, within, and/or near, the approaching intersection.

An intersection type includes one or more designations that describe the configuration of the intersection type. For example, designations of an intersection type may be based on the number of roads that merge at the intersection and/or the angle at which the roads merge relative to each other. Designations may also be based on the number of lanes, whether designated turning lanes are available, whether the intersection includes traffic lights, whether a bus stop is designated adjacent to the intersection, whether a crosswalk is defined at the intersection, and/or any combination of other intersection factors. Various intersection types and associated designations are described in detail below.

In one embodiment, the vehicle controller utilizes at least two process models to determine a course of action for the vehicle. For example, in the exemplary embodiment, a first process model includes an intersection classification (IC) model that is used to determine the type of intersection, and a second model includes an intersection specific (IS) model that is used to determine one or more courses of action for the vehicle to perform. In some embodiments, the vehicle controller may include a single IC model and a plurality of IS models. Each of the IS models is associated with a specific type or category of intersection.

In one embodiment, one or more IC model inputs may be applied to the IC model to determine one or more IC model outputs. Likewise, one or more IS model inputs may be applied to the IS model to determine one or more IS model outputs. The IC model outputs include a determined intersection type. The IS model outputs include one or more courses of action for the vehicle to perform at the intersection. The IC model inputs and the IS model inputs may include sensor data collected from one or more of the sensors. The one or more of the IC model inputs may be the same as one or more of the IS model inputs. In some embodiments, one or more of the IC model inputs and the IS model inputs may be different. In some embodiments, the IC model inputs are less than, and/or a subset of the IS model inputs.

In some embodiments, the IC model inputs may include image data collected from sensors, such as video devices, imaging devices, and/or a camera. In other embodiments, the IC model inputs may include additional and/or alternative inputs. In some embodiments, the IS model inputs may include data collected from sensors, such as radar, LIDAR, proximity sensors, ultrasonic sensors, electromagnetic sensors, wide RADAR, long distance RADAR, Global Positioning System (GPS), video devices, imaging devices, cameras, audio recorders, and computer vision.

In the exemplary embodiment, the vehicle controller, initially, determines an intersection type of an approaching intersection using the IC model, then subsequently, after the intersection type is determined, the vehicle controller determines one or more vehicle courses of action for the vehicle to perform using the IS model corresponding to the previously identified intersection type. In other words, the vehicle controller applies IC model inputs to the IC model initially to determine the intersection type. After the intersection type is identified, the vehicle controller may retrieve, e.g., from a database and/or a memory, an IS model associated with the identified intersection type. The vehicle controller then applies the IS inputs to the IS model to determine one or more courses of action for the vehicle to perform at the intersection.

In some embodiments, vehicle courses of action may include at least one of the following actions: steering, accelerating, maintaining a speed, and/or decelerating. In some embodiments, the course of action may include an intersection path, such as an optimal path or a safe path for the vehicle to follow through the intersection. The courses of action may also include steering the vehicle to follow the intersection path through the intersection or in proximity to the intersection. The determined vehicle course of action may include additional and/or alternative courses of action. In some embodiments, the IS model and/or the vehicle controller uses a destination of the vehicle to determine the one or more courses of action for the vehicle. The destination may be a target location of the vehicle, requiring the vehicle to traverse one or more intersections along the way towards the destination. For example, the IS model and/or the vehicle controller may incorporate the destination when determining the one or more courses of action, and/or the intersection path, for the vehicle to perform.

The IS model and/or the vehicle controller may also incorporate the detection of obstacles, e.g., other vehicles and/or objects, when determining the courses of action. In some cases, the IS model and/or the vehicle controller may determine one or more maneuvering controls to avoid obstacles in the intersection and/or to avoid obstacles in the determined intersection path.

In some embodiments, the IC model inputs may be collected prior to the collection of IS model inputs. Alternatively, the IC model inputs and the IS model inputs may be collected substantially simultaneously. In some embodiments, the vehicle controller may collect IC model inputs, apply the IC model inputs to the IC model, and determine an intersection type, concurrently while continuously collecting the IS model inputs.

In some embodiments, the vehicle controller may determine an intersection type without applying the IC model. For example, in some embodiments, the intersection type may have been previously identified and/or the intersection type may be obtained, and as such it is unnecessary to apply the IC model. In some embodiments, the intersection type may have been previously identified by the vehicle controller, and the vehicle controller stored the identified intersection type in a memory and/or a database for subsequent retrieval. In some embodiments, the vehicle controller may be communicatively coupled to a location sensor, e.g., Global Positioning System (GPS) sensor, such that the vehicle controller may determine the location of the vehicle. The vehicle controller may use the location of the vehicle to determine an intersection type. In some embodiments, the vehicle controller may receive and/or retrieve an intersection type from other sources, e.g., a map source (e.g., Google maps). Accordingly, in some embodiments, it may be unnecessary to execute the IC model, and the vehicle controller may directly apply the IS model associated with the previously determined intersection type to determine one or more courses of action.

The vehicle controller may generate, e.g., train, tune, and/or update, the IC model using historic intersection data. The historic data may include a plurality of images and/or videos of intersections and an associated identification of the intersection type. The historic data may include a plurality of intersection records. In the exemplary embodiment, each intersection record includes: i) an identified intersection type of the historic intersection, ii) one or more designations that describe the configuration of the historic intersection, and iii) any sensor data previously transmitted of the historic intersection (e.g., images and/or video of the intersection taken from various vantage points and/or a street view of the intersection).

The IC model may be generated using any suitable historic training data. For example, the IC model may be generated using a plurality of historic intersection records of different intersection types and/or designations. As such, the IC model determines an IC model output including an intersection type for a wide range of intersection types, using IC model inputs including images and/or video. In some embodiments, the IC model inputs only include images and/or video. Video and images of traffic intersections may be collected at a pre-determined distance, e.g., 0.5 miles, from an approaching intersection. Accordingly, the vehicle controller may collect, and/or receive, IC model inputs, apply the IC model inputs to the IC model, and determine the intersection type in advance of the intersection. For example, the vehicle controller may determine the intersection type when the vehicle is greater than 0.25 miles away from the intersection, when the vehicle is 0.1-0.25 miles from the intersection, and/or when the vehicle is greater than 0.5 miles away from the intersection.

In some embodiments, each of the IS models are associated with a specific intersection type, and each of the IS models are generated, e.g., trained, tuned and/or updated, using a dataset that includes relevant, and/or focused, data pertinent to the intersection type of the IS model. For example, each individual IS model may be generated using an intersection specific historic dataset associated with the specific intersection type of the IS model. The IS model may be generated using a plurality of historic vehicle records including vehicle interactions at intersections of the same intersection type. In the exemplary embodiment, the intersection specific historic dataset is reduced from a comprehensive dataset including more than one type of intersection. For example, an IS-Type A model is generated using historic vehicle records for vehicles interacting with intersections of an intersection Type A. Generating the IS model using a reduced size and with a more focused training dataset facilitates improving the computational efficiency during generation and/or updating the IS model. For example, training of the IS model using the reduced and focused dataset is generally faster and requires less computational resources, e.g., less memory, and/or improved processor efficiency (e.g., CPU efficiency). Furthermore, applying the IS model, trained using the focused and reduced size dataset, enables courses of actions suitable for the intersection type to be determined quickly, reliably, and efficiently.

In some embodiments, the IS model may be generated, e.g., trained, tuned, and/or updated, using one or more allowable courses of action and/or one or more prevented and/or restricted courses of action. The allowable, prevented, and/or restricted courses of action may be associated with the particular type and/or designation of the intersection. For example, for an intersection type having a T-shape, the vehicle controller determines courses of actions that are limited to turning onto one of the two available roads. In another example, an intersection type may have designated turn lanes, and the vehicle controller may determine, if the vehicle is going to make a left turn, that the vehicle is required to enter and use the left turn lane.

In some embodiments, the IS model may have one or more model outputs including a right-of-way determination. That is, one course of action for the vehicle may include determining a right-of-way between multiple vehicles approaching the intersection at substantially the same time. For example, one model output may include a course of action for the vehicle based on the determined right-of-way. In another example, a model output may include determining that the vehicle does not have a right-of-way and determining one or more breaking or yielding operations to be performed by the vehicle. In another example, a model output may include determining that the vehicle has a right-of-way and determining a speed or accelerating operation to be performed by the vehicle.

In some embodiments, the user/driver may store preferences that would let the vehicle controller know if there are any extra considerations in its decision-making process. The vehicle controller may use these preferences as weights in its decision-making process. In some of these embodiments, the user directly enters their preferences. For example, the user/driver may want to minimize left turns across a lane designated for an opposite flow of traffic. In other embodiments, the vehicle controller learns these preferences over time based on the user's driving behavior. Other preferences may include regional or national preferences based on observations of the vehicle controller and/or a plurality of vehicle controllers.

At least one of the technical problems addressed by this system may include: (i) improving the determination of one or more courses of vehicle actions for the vehicle to perform at, and/or in proximity to, one or more identified types of intersections, (ii) improving the computational efficiency, e.g., decreased computational times and/or reduced computational load, when determining one or more courses of action for the vehicle to perform at, and/or in proximity to, one or more identified types of intersections, (iii) identification and/or classification of a plurality of intersection types; (iv) identification and/or classification of an intersection type using images; and/or (v) providing intersection specific vehicle courses of action based on the identification of the intersection type.

The methods and systems described herein may be implemented using computer programming or engineering techniques including computer software, firmware, hardware, or any combination or subset thereof, wherein the technical effects may be achieved by performing at least one of the following steps: a) collect a first plurality of sensor information observed/sensed by at least a first sensor during operation of a vehicle; b) collect a second plurality of sensor information observed/sensed by at least a second sensor during operation of a vehicle; c) execute a first classification model to determine an intersection type from a plurality of intersection types; and d) after the intersection type has been determined, executing an intersection specific model associated with the identified intersection type to determine one or more vehicle courses of action for the vehicle to perform at the determined intersection type.

In still further embodiments, the technical effects may be achieved by performing at least one of the following steps: a) generate a classification model using a plurality of historical records for different types of historic intersections; b) generate one or more individual intersection specific models, wherein each individual intersection specific model is trained using only a subset of the plurality of historic records for historic intersections having the same intersection type; c) collect a first plurality of sensor information observed by at least the first sensor during operation of a vehicle; d) collect a second plurality of sensor information observed by at least the second sensor during operation of a vehicle; e) obtaining the intersection type, from one or more sources without executing the classification model; and/or f) executing the intersection specific model to determine one or more vehicle courses of action that are actions specific to the determined intersection type.

FIG. 1 depicts a view of an exemplary vehicle 100. In some embodiments, vehicle 100 may be an autonomous or semi-autonomous vehicle capable of fulfilling the transportation capabilities of a traditional automobile or other vehicle. In these embodiments, vehicle 100 may be capable of sensing its environment and/or navigating through traffic intersections without human input. In other embodiments, vehicle 100 is a manually driven vehicle or a semi-autonomous vehicle that includes driver assistance systems, such as, but not limited to, lane keep assistance, and/or parallel-parking assistance, wherein the vehicle may be driven as a traditional automobile that is controlled by a driver 115.

Vehicle 100 may include a plurality of sensors 104 and a vehicle controller 110. The sensors 104 may detect the current surroundings and location of vehicle 100. The sensors 104 may include, but are not limited to, radar, LIDAR, proximity sensors, ultrasonic sensors, electromagnetic sensors, wide RADAR, long distance RADAR, Global Positioning System (GPS), video devices, imaging devices, cameras, audio recorders, and computer vision. The sensors 104 may also detect operating conditions of vehicle 100, such as speed, acceleration, gear, braking, and/or other conditions related to the operation of vehicle 100, for example: at least one of a measurement of the speed, direction, rate of acceleration, rate of deceleration, location, position, orientation, and/or rotation of the vehicle, and a measurement of one or more changes to the speed, direction rate of acceleration, rate of deceleration, location, position, orientation, and/or rotation of the vehicle. Furthermore, sensors 104 may include impact sensors that detect impacts to vehicle 100, including the force and direction, and/or the deployment of airbags. In some embodiments, sensors 104 may detect the presence of driver 115 and/or one or more passengers (not shown) in vehicle 100. In such embodiments, sensors 104 may detect the presence of fastened seatbelts, the weight occupying each seat in vehicle 100, heat signatures, and/or any other method of detecting information about driver 115 and/or passengers in vehicle 100.

In some embodiments, the sensors 104 may determine weight distribution information of vehicle 100. Weight distribution information may include, but is not limited to, the weight and location of remaining gas, luggage, occupants, and/or other components of vehicle 100. In some embodiments, sensors 104 may determine remaining gas, luggage weight, occupant body weight, and/or other weight distribution information. Furthermore, the sensors 104 may detect attachments to the vehicle 100, such as cargo carriers or bicycle racks attached to the top of the vehicle 100 and/or a trailer attached to a hitch on the rear of the vehicle 100.

In some embodiments, the sensors 104 include cameras, LIDAR, radar, proximity detectors, and/or other sensors 104 that provide information about the surroundings of the vehicle 100, such as, but not limited to, other vehicles including the vehicle type and the vehicle load, obstacles, traffic flow information including road signs, traffic lights, and other traffic information, and/or other environmental information, including current weather conditions.

In some embodiments, the sensors 104 may include one or more first sensors 106, and one or more second sensors 108. The first sensors 106 collect images and/or videos, e.g., the first sensors may include a video and/or a camera, and the second sensors 108 may include any other type of sensor.

Vehicle controller 110 may interpret the sensory information, obtained from sensors 104, to identify appropriate navigation paths through intersections, to detect threats, and/or to react to conditions. In some embodiments, vehicle controller 110 may be able to communicate with one or more remote computer devices, such as mobile device 125. In the example embodiment, mobile device 125 is associated with a driver 115 and includes one or more internal sensors, such as an accelerometer, a gyroscope, and/or a compass. Mobile device 125 may be capable of communicating with vehicle controller 110 wirelessly. In addition, vehicle controller 110 and mobile device may be configured to communicate with computer devices located remotely from vehicle 100.

The vehicle controller 110 may receive user preferences from the user through the mobile device 125 or through an infotainment panel 130. The vehicle controller 110 may also receive preferences via one or more remote servers, such as an intersection controller 610 (shown in FIG. 6). These remote servers may be associated with the vehicle manufacturer or other service provider that provides preference information. The remote servers may also provide traffic information including, but not limited to, travel routes, maps, traffic light timing, and/or current traffic load in areas in proximity to the vehicle 100.

In some embodiments, vehicle 100 may include autonomous or semi-autonomous vehicle-related functionality or technology that may be used to replace human driver actions. Such actions may include, but are not limited to only including, and/or be related to the following types of functionality: (a) fully autonomous (driverless); (b) limited driver control; (c) vehicle-to-vehicle (V2V) wireless communication; (d) vehicle-to-infrastructure (and/or vice versa) wireless communication; (e) automatic or semi-automatic steering; (f) automatic or semi-automatic acceleration; (g)

automatic or semi-automatic braking; (h) automatic or semi-automatic blind spot monitoring; (i) automatic or semi-automatic collision warning; (j) adaptive cruise control; (k) automatic or semi-automatic parking/parking assistance; (l) automatic or semi-automatic collision preparation (windows roll up, seat adjusts upright, brakes pre-charge, etc.); (m) driver acuity/alertness monitoring; (n) pedestrian detection; (o) autonomous or semi-autonomous backup systems; (p) road mapping systems; (q) software security and anti-hacking measures; (r) theft prevention/automatic return; and/or (s) automatic or semi-automatic driving without occupants; and/or other functionality. In these embodiments, the autonomous or semi-autonomous vehicle-related functionality or technology may be controlled, operated, and/or in communication with vehicle controller 110.

The wireless communication-based autonomous or semi-autonomous vehicle technology or functionality may also include and/or be related to: automatic or semi-automatic steering; automatic or semi-automatic acceleration and/or braking; automatic or semi-automatic blind spot monitoring; automatic or semi-automatic collision warning; adaptive cruise control; and/or automatic or semi-automatic parking assistance. Additionally, or alternatively, the autonomous or semi-autonomous technology or functionality may also include and/or be related to: driver alertness or responsive monitoring; pedestrian detection; artificial intelligence and/or back-up systems; hazard avoidance; navigation or GPS-related systems; security and/or anti-hacking measures; and/or theft prevention systems.

While vehicle 100 may be an automobile in the exemplary embodiment, in other embodiments, vehicle 100 may be, but is not limited to, other types of ground craft including buses, cargo-carriers, or trucks, aircraft, watercraft, and/or spacecraft vehicles.

Figure 2:
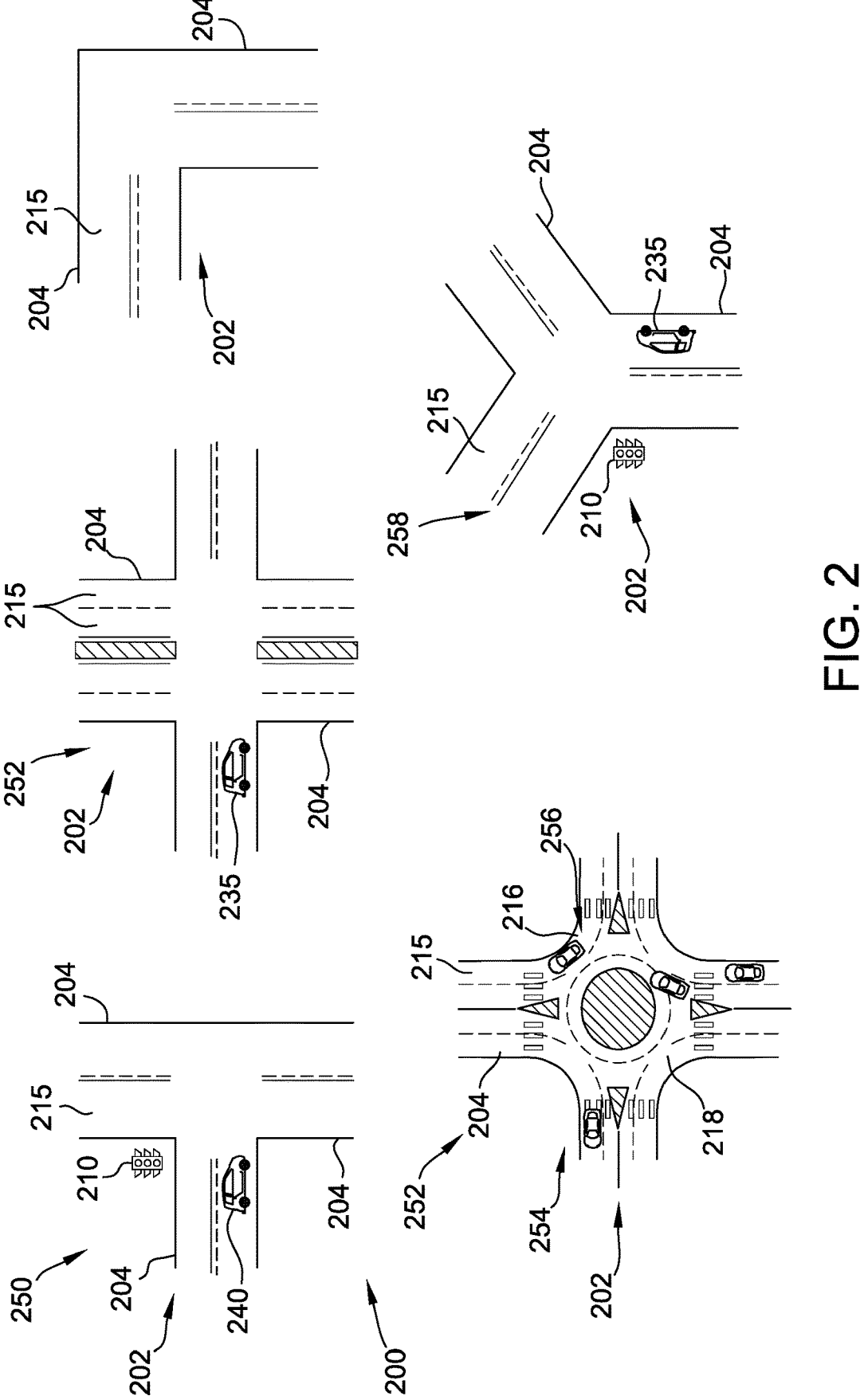
FIG. 2 illustrates a schematic diagram of exemplary intersections that may be traversed by the vehicle shown in FIG. 1, for example.

FIG. 2 is a schematic illustration 200 of a plurality of exemplary intersection types 202, having various configurations. For example, intersection types 202 may include one or more roads 204 that merge to form the intersection type 202. The intersection types 202 may or may not have one or more traffic signals 210 (also known as traffic lights 210) designed to assist controlling a flow of traffic for a plurality of lanes 215. The plurality of lanes 215 may include left turn lanes, straight lanes, and/or right turn lanes, for example. Each lane 215 may include one or more vehicles 235. For the purposes of this discussion, the vehicles 235 can include, but are not limited to only including, sedans, sportscars, vans, panel vans, pick-up trucks, buses, trolley cars, public transportation, tractor trailers, 18-wheelers, RVs (recreational vehicle), motorcycles, scooters, bicycles, trailers, emergency vehicles, farm vehicles, oversized vehicles, and/or any other type of vehicle 235. In addition to vehicles 235, FIG. 2 also illustrates an exemplary user's vehicle 240. More specifically, in the exemplary embodiment, user's vehicle 240 is similar to vehicle 100 (shown in FIG. 1), wherein vehicle 240 includes a vehicle controller 110 (shown in FIG. 1).

Each intersection type 202 includes one or more designations associated with one or more features and/or configurations associated with the intersection type 202. For example, designations may include one or more of the following: a) number of roads merging at the intersection (referred to herein as n-way, where n is an integer number); b) traffic circle; c) number of lanes (referred to herein as m-lanes, wherein m is an integer); d) number of lanes for each of the roads merging at the intersection; e) controlled (e.g., having one or more traffic lights) or uncontrolled (e.g., having no traffic lights); f) controlled or uncontrolled status for each of the roads merging at the intersection; g) merging lanes or no merging lanes; h) pedestrian cross-walk or no pedestrian cross-walk; i) median or no median, j) stop sign or no stop sign; k) yield sign or no yield sign; l) speed limit; m) train-crossing (e.g., locomotion train, passenger train, tram, streetcar, and/or other rail-type transportation) crossing or no train-crossing, n) bus stop or no bus stop, and/or o) traffic data (e.g., heavy traffic, mild traffic, minimal traffic, number of merging vehicles, and/or number of vehicles in a road or a lane). In other embodiments, there may be additional and/or alternative designations that describe additional features of a traffic intersection.

Each intersection type 202 may have one or more designations that describe the configuration of the intersection type. For example, an exemplary intersection type A, indicated generally at 250, is a 3-way intersection having two different roads, wherein a first road ends at the intersection type A, and where intersection A is controlled by traffic signals 210. Intersection type A includes two traffic lanes 215 for each of the roads 204, and the roads 204 converge in a T-shaped orientation. In another example, an intersection type B, indicated generally at 252, includes a 4-way having two different roads that merge at the intersection type B. Intersection type B includes a first road 204 having four traffic lanes 215 and a second road 204 having two traffic lanes 215. In another example, intersection type C, indicated generally at 254, includes a traffic circle 256 having four roads 204 that merge at the intersection type C, wherein each of the roads 204 includes two traffic lanes 215. The traffic circle 256 of intersection type C includes two traffic lanes 215: an inner traffic lane 216 and an outer traffic lane 218. In yet another example, an intersection type D, indicated generally at 258, includes three roads 204 that merge at intersection type D, where the roads 204 merge in a Y-shaped orientation. In yet another example, an intersection type F includes two roads 204 that merge at intersection type F wherein the roads 204 are generally perpendicular to each other.

In other embodiments, intersection types 202 may include any other suitable configuration having one or more designations describing the configuration of an intersection type 202. Intersection types A-F, described above, are exemplary and should not be construed as limiting to the various configurations that an intersection type 202 may have. Intersection types may include any one or more of the designations listed above and/or alternative and/or additional designations.

Figure 3:
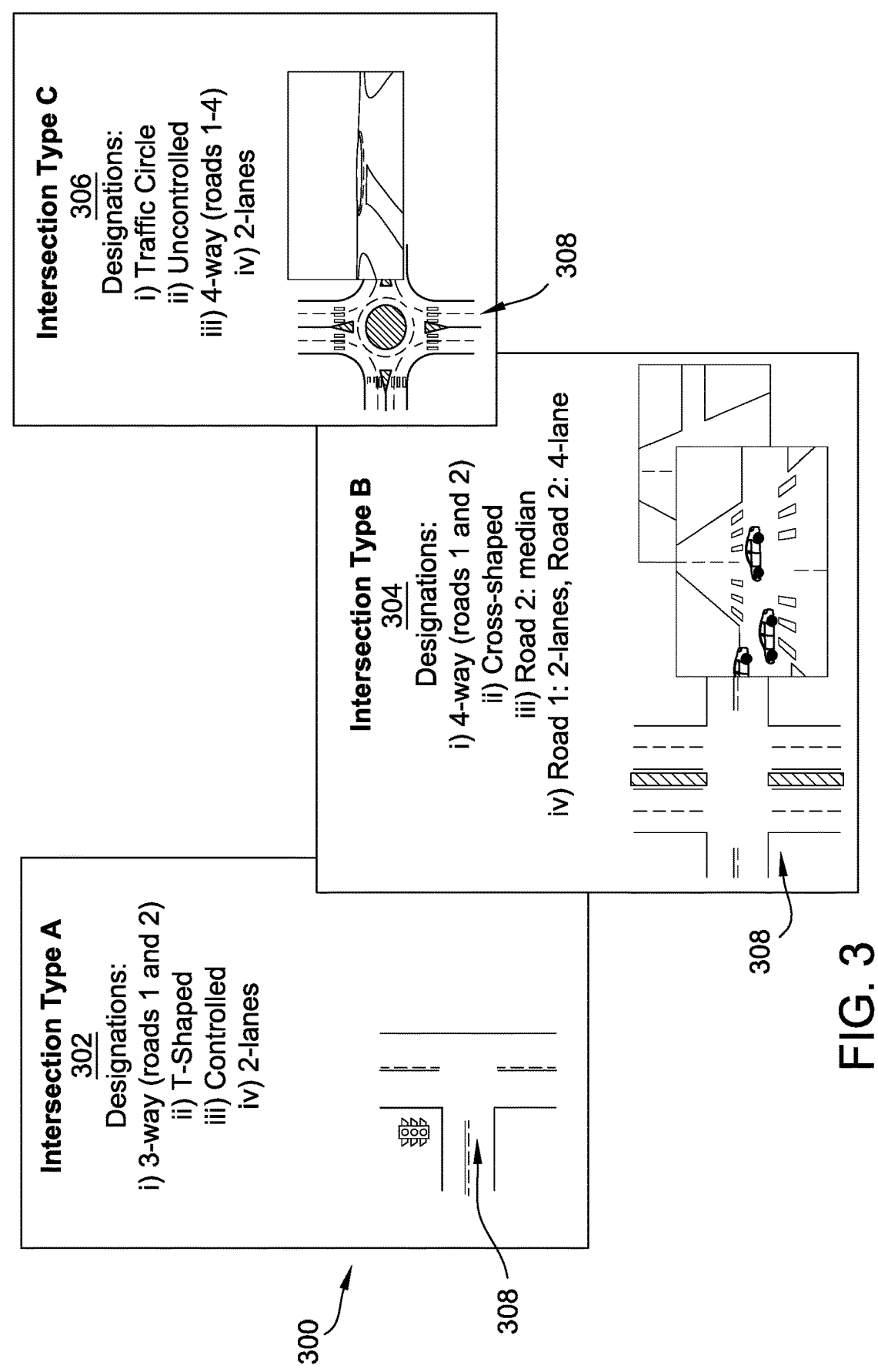
FIG. 3 illustrates exemplary intersection type records that may be used by a control system used with the vehicle shown in FIG. 1, for example.

FIG. 3 illustrates exemplary intersection type records, indicated generally at 300. Each intersection record 300 is associated with a specific intersection type 202. For example, an intersection type A record, indicated at 302, includes a plurality of designations including: i) 3-way (roads 1 and 2), ii) T-shaped (having a first road intersecting road 2, substantially perpendicularly), and iii) controlled, iv) each road includes 2 traffic lanes. An exemplary intersection type B record, indicated at 304, includes a plurality of designations including: i) 4-way (roads 1 and 2), ii) cross-shaped (having roads 1 and 2 intersecting substantially perpendicularly), iii) road 1 includes a median, and iv) road 1 has 2 traffic lanes and road 2 has 4 traffic lanes. An exemplary intersection type C, indicated at 306, includes a plurality of designations including: i) Traffic circle, ii) 4-way (road 1, road 2, road 3, and road 4), iii) roads 1-4 include 2 traffic lanes.

In other embodiments, the intersection type records include additional and/or alternative information and/or data associated with the intersection types. In some embodiments, the intersection type records 300 may include images 308, and/or video, of the intersection. The images and/or videos may have been collected by sensors 104, and/or previously collected by historic sensors, e.g., attached to historic vehicles previously traveling through and/or in proximity to the intersection. The images and/or video may be collected from various vantages and/or at various approaching speeds of the historic vehicle. The images 308, and/or video, may have been collected at street level view. FIG. 4 illustrates a flowchart of an exemplary process 400 that may be implemented to determine one or more vehicle courses of action, e.g., steering, accelerating/decelerating, and/or an intersection path, for a vehicle to execute at a determined intersection type (shown in FIGS. 2 and 3). In the exemplary embodiment, process 400 is implemented by the vehicle controller 110 (shown in FIG. 1) in the user's vehicle 100 (shown in FIG. 1). In other embodiments, portions of process 400 are performed by the vehicle controller 110 and other portions of the process are performed by one or more remote servers, such as intersection controller 610 (shown in FIG. 6). In some embodiments, an intersection type is determined by the intersection controller 610 and the one or more courses of action are determined by the vehicle controller 110.

The vehicle controller 110 monitors 402 the road ahead of the user's vehicle 230. Monitoring 402 may include the vehicle controller 110 receiving first sensor data from at least the first sensors 106 (shown in FIG. 1). In some embodiments, the first sensor 106 includes a camera oriented to collect images or video. In other embodiments, the first sensor 106 may include a RADAR, LIDAR, and/or any other sensor able to detect objects at a distance.

Process 400 determining 404 an intersection type 202 of an approaching intersection. Determining the intersection type 202 may include the vehicle controller 110 applying the first sensor data to a model, e.g., IC model, to determine the intersection type. In some embodiments, the vehicle controller 110 may receive the intersection type, e.g., from intersection controller 610, a map service (e.g., google maps, maps, etc.) and/or any other suitable source.

In some embodiments, determining 404 an intersection type may include the vehicle controller transmitting first sensor data to the intersection controller 610 and the intersection controller 610 may apply the first sensor data to the IC model to determine the intersection type. The intersection controller 610 may subsequently transmit the determined intersection type to the vehicle controller.

Process 400 may further include monitoring 406 the road ahead of the user's vehicle by receiving second sensor data from the second sensors 108 (shown in FIG. 1). In some embodiments, the second sensors include a RADAR, LIDAR, or other sensors able to detect objects at a distance. The vehicle controller 110 may monitor 406 the road using the first sensors 106 and/or the second sensors 108. The process 400 may include monitoring 402 the road 204 with the first sensors 106 while monitoring 406 the road with the second sensors 108, substantially simultaneously, and/or during predefined overlapping time periods. Process 400 may determine 404 the intersection type, while simultaneously monitoring 402 and 406 the road ahead using both the first and the second sensors 106 and 108.

After determining 404 the intersection type, process 400 determines 408 one or more courses of action for the vehicle to perform at the intersection having the determined intersection type. Determining 408 courses of action for the vehicle to perform may include retrieving 410, from a memory and/or a database, an IS model associated with the determined 404 intersection type. For example, if the vehicle controller 110 determined 404 that the intersection is the intersection type A, then the vehicle controller 110 retrieves an IS model associated with the intersection type A, e.g., IS-Type A model, and applies either, or both, of the first sensor and second sensor data, to the IS model to determine one or more courses of action for the vehicle to perform.

Process 400 may include the vehicle controller 110 generating the IC and the IS mode. The vehicle controller 110 may generate the IC model using a plurality of intersection type records 300 having various intersection types. The intersection type records 300 include an identified intersection type and one or more designations. The intersection type record 300 may also include historically collected images and/or video of intersections. The intersection type record 300 may include any suitable data used to train and/or generate the IC model.

The vehicle controller 110 generates the IS model using historic vehicle courses of actions performed by one or more historic vehicles at the intersection type associated with the type of IS model being trained. The vehicle controller 110 may generate each IS-type model individually, using separate training datasets. For example, the vehicle controller 110 may generate an IS-Type A model using historical vehicle courses of action performed by one or more historic vehicles at one or more intersections having the intersection type A. In another example, the vehicle controller 110 may generate an IS-Type B model using historical vehicle courses of action performed by one or more historic vehicles at one or more intersections having the intersection type B.

In some embodiments, the vehicle controller 110 generates the IS model using one or more constraints. The constraints may be based on the one or more designations of the intersection type. The constraints may limit the courses of action that the IS model will be able to predict based on the designations of the intersection type. For example, an intersection type A has a designation that includes a 3-way intersection having a T-shape. The intersection type A only has two available options that the vehicle may be able to turn onto, e.g., left onto road 2 or right onto road 2, and therefore, the IS model may be constrained to determine a course of action that includes turning onto either one of the available directions. In other words, the IS model is constrained from predicting courses of actions that are unavailable due to the configuration of the intersection type. In another example, for an intersection type having a designated left turning lane, the IS model may be constrained to determine a course of action for a left turn that includes an intersection path using the left turn lane, e.g., the IS model will not predict a course of action including making a left turn using a middle or a right-hand lane. In some other embodiments, system 600 (shown in FIG. 5), e.g., a computer system, may generate either, or both, of the IC model and the IS model. In another example, the IS model may determine a right-of-way for multiple vehicles that merge at the intersection.

Figure 5:
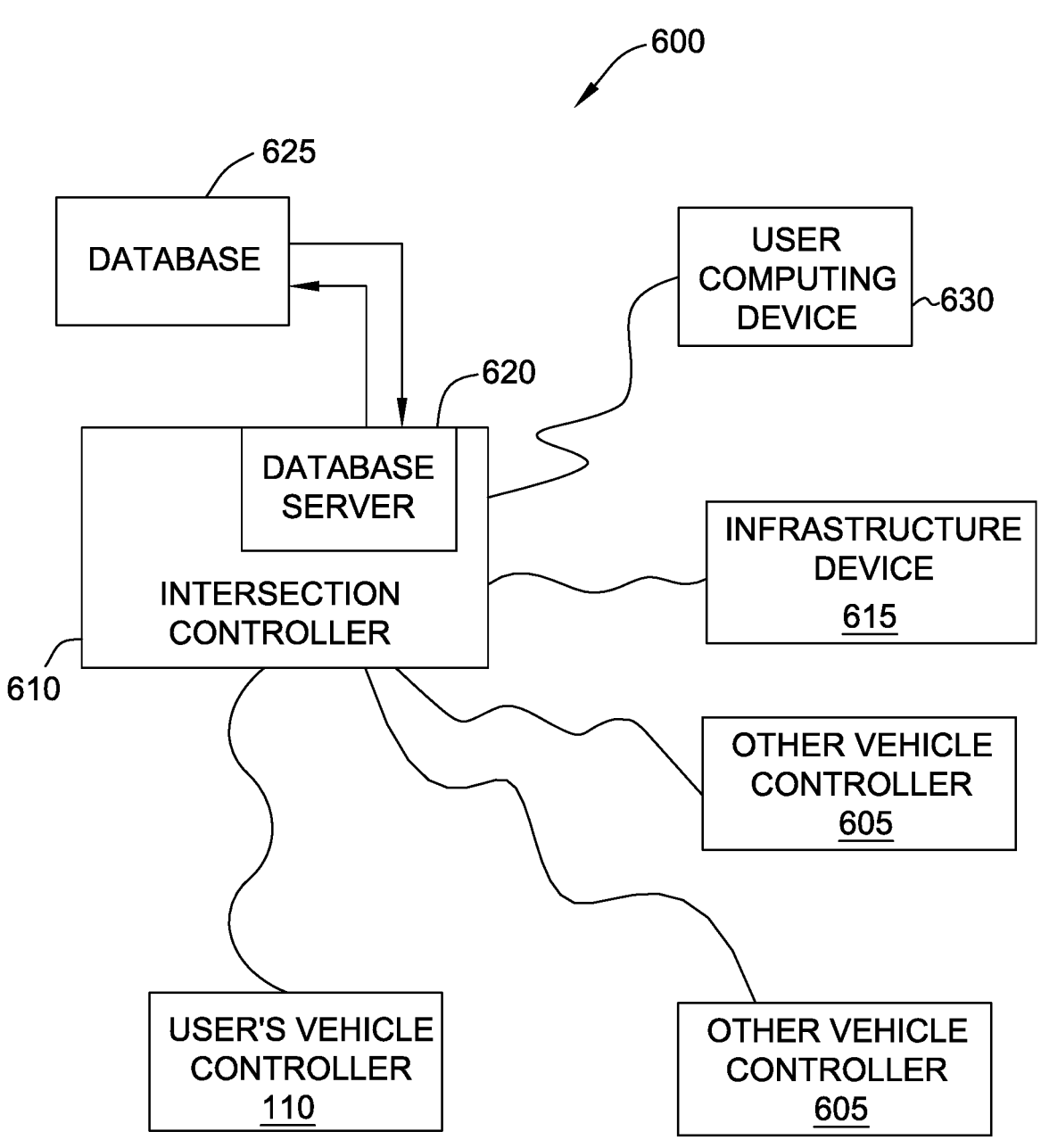
FIG. 5 illustrates a simplified block diagram of an exemplary system that may be used to implement one or more processes shown in FIG. 4.

FIG. 5 illustrates a simplified block diagram of an exemplary system 600 for implementing one or more steps of process 400 (shown in FIG. 4). In the exemplary embodiment, system 600 may be used for one or more of the following: i) determining an intersection type and/or ii) determining one or more course of action for the vehicle to perform at the determined intersection type. In some embodiments, the system 600 may be used to perform one or more additional tasks, including: i) monitoring vehicles 100, e.g., vehicle 240 and/or vehicles 235 (shown in FIGS.

1 and 2), detecting traffic light indications and/or patterns, and/or determining appropriate vehicle routes through the determined intersection type.

As described below in more detail, an intersection controller 610 (also known as a vehicle intersection server 610) may be configured to i) collect a first plurality of sensor information observed by at least the sensors 104 (shown in FIG. 1) during operation of a vehicle 240 (shown in FIG. 2); ii) collect sensor information observed by sensor positioned in proximity to an intersection, iii) detect one or more designations of an intersection, e.g., detect a number of merging roads, detecting a number of lanes, etc. based on the first plurality of sensor information, iv) determine an intersection type based on the first plurality of sensor information and/or the detected one or more designations, and/or v) detect traffic signals at an intersection type (shown in FIG. 2) in a direction of travel of the vehicle 240 based on the first plurality of sensor information; vi) determine a number of vehicles 235 in each lane 215 (both shown in FIG. 2) based on the first plurality of sensor information.

In the exemplary embodiment, user's vehicle controller 110 and other vehicle controller 605 are processors that control one or more aspects of the operation of a vehicle 100 or user's vehicle 240. Vehicle controller 605 is similar to vehicle controller 110, and vehicle controllers 110 and 605 are in communication with one or more vehicle traffic light controllers 610. More specifically, user's vehicle controller 110 and controller 605 may be communicatively coupled through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and/or a cable modem.

In the exemplary embodiment, an infrastructure device 615 is configured to provide traffic information. The traffic information may include, but is not limited to only including, traffic light timing, sensor information about one or more roadways, and/or traffic information. The infrastructure device 615 couples to the intersection controller 610, and/or the vehicle controller 110, through various wired or wireless interfaces including without limitation a network, such as a local area network (LAN) or a wide area network (WAN), dial-in-connections, cable modems, Internet connection, wireless, and/or special high-speed Integrated Services Digital Network (ISDN) lines. The infrastructure device 615 receives data about the current traffic conditions and transmits that data to the intersection controller 610.

In other embodiments, the infrastructure device 615 is in communication with the user's vehicle controller 110 and controllers 605 to provide traffic information in real-time or near real-time. In some embodiments, the infrastructure device 615 associated with one or more sensors positioned in proximity to the intersection. In further embodiments, the infrastructure device 615 provides images from one or more cameras at the intersection. In still further embodiments, the infrastructure device 615 wirelessly broadcasts information to all vehicles in the nearby area, such as through Wi-Fi, Bluetooth, and/or ZigBee communications. In some embodiments, the infrastructure device 615 can also include a mapping program server or other program to assist with navigating the vehicle 100 or user's vehicle 240.

A database server 620 may be communicatively coupled to a database 625 that stores data. In one embodiment, database 625 may include identified intersection types. In the exemplary embodiment, database 625 may be stored remotely from intersection controller 610. In some embodiments, database 625 may be decentralized. In the exemplary embodiment, the user may access database 625 via user computer device 630 by logging onto intersection controller 610, as described herein.

In the exemplary embodiment, user computer devices 630 are computers that include a web browser or a software application, which enables user computer devices 630 to access remote computer devices, such as intersection controller 610, using the Internet or other network. More specifically, user computer devices 630 may be communicatively coupled to the Internet through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem. User computer devices 630 may be any device capable of accessing the Internet including, but not limited to, a desktop computer, a laptop computer, a personal digital assistant (PDA), a cellular phone, a smartphone, a tablet, a phablet, wearable electronics, smart watch, or other web-based connectable equipment or mobile devices.

Intersection controller 610 may be communicatively coupled with one or more of user's vehicle controller 110, other vehicle controller 605, infrastructure device 615, and user computer device 630. In some embodiments, intersection controller 610 may be associated with, or is part of a computer network associated with a vehicle manufacturer or a travel information provider, or in communication with vehicle manufacturing network or travel information provider network. In other embodiments, intersection controller 610 may be associated with a third party and is in communication with the vehicle manufacturing or travel information providing networks. In still further embodiments, the intersection controller 610 may be a part of the vehicle controller 110 and executed on the user's vehicle 100. More specifically, the intersection controller 610 is communicatively coupled to the Internet through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem. The intersection controller 610 may be any device capable of accessing the Internet including, but not limited to, a desktop computer, a laptop computer, a personal digital assistant (PDA), a cellular phone, a smartphone, a tablet, a phablet, wearable electronics, smart watch, or other web-based connectable equipment or mobile devices. In the exemplary embodiment, the intersection controller 610 hosts an application or website that allows the user's vehicle controller 110 and the other vehicle controllers 605 to access the functionality described herein. In some further embodiments, vehicle controller 110 and other vehicle controllers 605 include an application that facilitates communication with the intersection controller 610.

Figure 6:
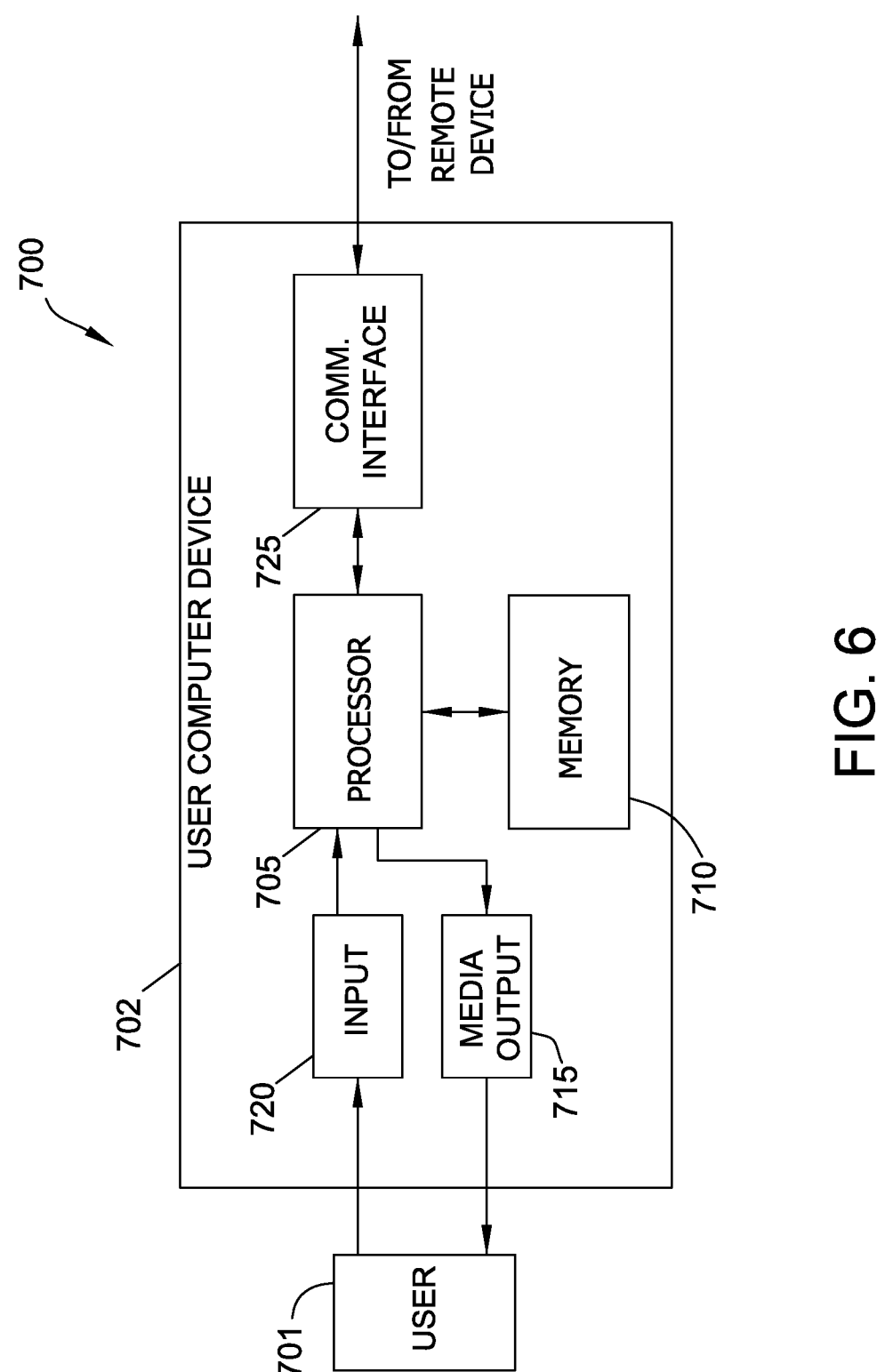
FIG. 6 illustrates an exemplary configuration of a user computer device that may be used to implement one or more processes shown in FIG. 4.

In FIG. 6 depicts an exemplary configuration of a user computer device, e.g., mobile device 125, shown in FIG. 1. User computer device 702 may be operated by a user 701. In the exemplary embodiment, user 701 may be similar to driver 115 (shown in FIG. 1). User computer device 702 may include, but is not limited to, vehicle controller 110, mobile device 125 (shown in FIG. 1), other vehicle controller 605, intersection controller 610, infrastructure device 615, and user computer device 630 (all shown in FIG. 5). User computer device 702 may include a processor 705 for executing instructions. In some embodiments, executable instructions are stored in a memory area 710. Processor 705 may include one or more processing units (e.g., in a multi-core configuration). Memory area 710 may be any device allowing information such as executable instructions and/or transaction data to be stored and retrieved. Memory area 710 may include one or more computer readable media.

User computer device 702 may also include at least one media output component 715 for presenting information to user 701. Media output component 715 may be any component capable of conveying information to user 701. In some embodiments, media output component 715 may include an output adapter (not shown) such as a video adapter and/or an audio adapter. An output adapter may be operatively coupled to processor 705 and operatively coupleable to an output device such as a display device (e.g., a cathode ray tube (CRT), liquid crystal display (LCD), light emitting diode (LED) display, or "electronic ink" display) or an audio output device (e.g., a speaker or headphones).

In some embodiments, media output component 715 may be configured to present a graphical user interface (e.g., a web browser and/or a client application) to user 701, such as through the infotainment panel 130 (shown in FIG. 1). A graphical user interface may include, for example, route information. In some embodiments, user computer device 702 may include an input device 720 for receiving input from user 701. User 701 may use input device 720 to, without limitation, select and/or enter one or more locations to travel to.

Input device 720 may include, for example, a keyboard, a pointing device, a mouse, a stylus, a touch sensitive panel (e.g., a touch pad or a touch screen), a gyroscope, an accelerometer, a position detector, a biometric input device, and/or an audio input device. A single component such as a touch screen may function as both an output device of media output component 715 and input device 720.

User computer device 702 may also include a communication interface 725, communicatively coupled to a remote device such as mobile device 125 or vehicle controller 110. Communication interface 725 may include, for example, a wired or wireless network adapter and/or a wireless data transceiver for use with a mobile telecommunications network.

Stored in memory area 710 are, for example, computer readable instructions for providing a user interface to user 701 via media output component 715 and, optionally, receiving and processing input from input device 720. A user interface may include, among other possibilities, a web browser and/or a client application. Web browsers enable users, such as user 701, to display and interact with media and other information typically embedded on a web page or a website from vehicle controller 110. A client application allows user 701 to interact with, for example, vehicle controller 110. For example, instructions may be stored by a cloud service, and the output of the execution of the instructions sent to the media output component 715.

Processor 705 executes computer-executable instructions for implementing aspects of the disclosure. In some embodiments, the processor 705 is transformed into a special purpose microprocessor by executing computer-executable instructions or by otherwise being programmed. For example, the processor 705 may be programmed with the instructions such as those illustrated in FIG. 4.

In some embodiments, user computer device 702 may include, or be in communication with, one or more sensors, such as sensor 104 (shown in FIG. 1). User computer device 702 may be configured to receive data from the one or more sensors and store the received data in memory area 710.

Furthermore, user computer device 702 may be configured to transmit the sensor data to a remote computer device, such as vehicle controller 110 or mobile device 125, through communication interface 725.

Figure 7:
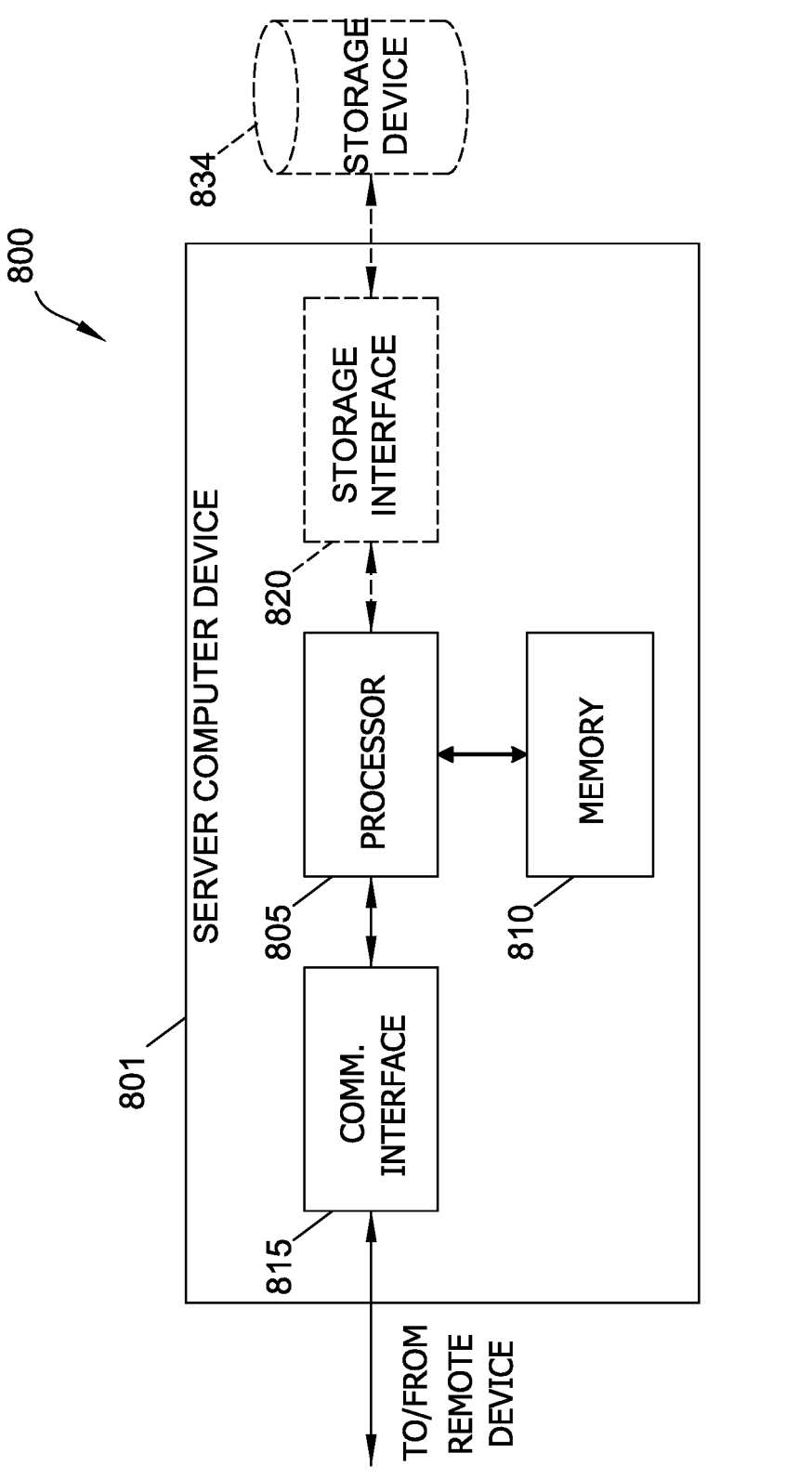
FIG. 7 illustrates an exemplary configuration of a server computer device, in accordance with one embodiment of the present disclosure.

FIG. 7 illustrates an exemplary configuration of a server computer device, e.g., intersection controller 610, shown in FIG. 5, in accordance with one embodiment of the present disclosure. Server computer device 801 may include, but is not limited to, vehicle controller 110 (shown in FIG. 1), intersection controller 610, and database server 620 (both shown in FIG. 5). Server computer device 801 also includes a processor 805 for executing instructions. Instructions may be stored in a memory area 810. Processor 805 may include one or more processing units (e.g., in a multi-core configuration).

Processor 805 is operatively coupled to a communication interface 815 such that server computer device 801 is capable of communicating with a remote device such as another server computer device 801, another vehicle traffic light controller 605, vehicle controller 110, or user computer device 630 (shown in FIG. 5). For example, communication interface 815 may receive requests from vehicle controllers 110 and other vehicle controllers 605 via the Internet, as illustrated in FIG. 6.

Processor 805 may also be operatively coupled to a storage device 834. Storage device 834 is any computer-operated hardware suitable for storing and/or retrieving data, such as, but not limited to, data associated with database 625 (shown in FIG. 5). In some embodiments, storage device 834 is integrated in server computer device 801. For example, server computer device 801 may include one or more hard disk drives as storage device 834. In other embodiments, storage device 834 is external to server computer device 801 and may be accessed by a plurality of server computer devices 801. For example, storage device 834 may include a storage area network (SAN), a network attached storage (NAS) system, and/or multiple storage units such as hard disks and/or solid-state disks in a redundant array of inexpensive disks (RAID) configuration.

In some embodiments, processor 805 is operatively coupled to storage device 834 via a storage interface 820. Storage interface 820 is any component capable of providing processor 805 with access to storage device 834. Storage interface 820 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 805 with access to storage device 834.

Processor 805 executes computer-executable instructions for implementing aspects of the disclosure. In some embodiments, the processor 805 is transformed into a special purpose microprocessor by executing computer-executable instructions or by otherwise being programmed. For example, the processor 805 is programmed with instructions such as illustrated in FIG. 4.

In further embodiments, the computer device is remote from the vehicle 100. The computer device receives the first plurality of sensor information wirelessly from the vehicle 100. The computer device performs the steps described above and then wirelessly presents an intersection type and/or one or more courses of action to the vehicle 100.

In some embodiments, the vehicle controller 110 steers the vehicle 100 according to the intersection route. In other embodiments, the vehicle 100 further includes a display device, such as infotainment panel 130 or a heads-up display. The vehicle controller 110 displays the intersection type and/or the one or more courses of action on via the display device.

In some additional embodiments, the vehicle controller 110 receives a third plurality of sensor information from one or more infrastructure-based sensors (not shown) positioned in proximity to the approaching intersection.

For the methods described above, the wireless communication-based autonomous or semi-autonomous vehicle technology or functionality may include and/or be related to: automatic or semi-automatic steering; automatic or semi-automatic acceleration and/or braking; automatic or semi-automatic blind spot monitoring; automatic or semi-automatic collision warning; adaptive cruise control; and/or automatic or semi-automatic parking assistance. Additionally, or alternatively, the autonomous or semi-autonomous technology or functionality may include and/or be related to: driver alertness or responsive monitoring; pedestrian detection; artificial intelligence and/or back-up systems; navigation or GPS-related systems; security and/or anti-hacking measures; and/or theft prevention systems.

The computer-implemented methods and processes described herein may include additional, fewer, or alternate actions, including those discussed elsewhere herein. The present systems and methods may be implemented using one or more local or remote processors, transceivers, and/or sensors (such as processors, transceivers, and/or sensors mounted on vehicles, stations, nodes, or mobile devices, or associated with smart infrastructures and/or remote servers), and/or through implementation of computer-executable instructions stored on non-transitory computer-readable media or medium. Unless described herein to the contrary, the various steps of the several processes may be performed in a different order, or simultaneously in some instances.

Additionally, the computer systems discussed herein may include additional, fewer, or alternative elements and respective functionalities, including those discussed elsewhere herein, which themselves may include or be implemented according to computer-executable instructions stored on non-transitory computer-readable media or medium.

In the exemplary embodiment, a processing element may be instructed to execute one or more of the processes and subprocesses described above by providing the processing element with computer-executable instructions to perform such steps/sub-steps, and store collected data (e.g., vehicle profiles, etc.) in a memory or storage associated therewith. This stored information may be used by the respective processing elements to make the determinations necessary to perform other relevant processing steps, as described above.

The aspects described herein may be implemented as part of one or more computer components, such as a client device, system, and/or components thereof, for example. Furthermore, one or more of the aspects described herein may be implemented as part of a computer network architecture and/or a cognitive computing architecture that facilitates communications between various other devices and/or components. Thus, the aspects described herein address and solve issues of a technical nature that are necessarily rooted in computer technology.

A processor or a processing element may be trained using supervised or unsupervised machine learning, and the machine learning program may employ a neural network, which may be a convolutional neural network, a deep learning neural network, a reinforced or reinforcement learning module or program, or a combined learning module or program that learns in two or more fields or areas of interest. Machine learning may involve identifying and recognizing patterns in existing data in order to facilitate making predictions for subsequent data. Models may be created based upon example inputs in order to make valid and reliable predictions for novel inputs.

Additionally, or alternatively, the machine learning programs may be trained by inputting sample data sets or certain data into the programs, such as images, object statistics and information, traffic timing, previous trips, and/or actual timing. The machine learning programs may utilize deep learning algorithms that may be primarily focused on pattern recognition and may be trained after processing multiple examples. The machine learning programs may include Bayesian Program Learning (BPL), voice recognition and synthesis, image or object recognition, optical character recognition, and/or natural language processing—either individually or in combination. The machine learning programs may also include natural language processing, semantic analysis, automatic reasoning, and/or machine learning.

Supervised and unsupervised machine learning techniques may be used. In supervised machine learning, a processing element may be provided with example inputs and their associated outputs and may seek to discover a general rule that maps inputs to outputs, so that when subsequent novel inputs are provided the processing element may, based upon the discovered rule, accurately predict the correct output. In unsupervised machine learning, the processing element may be required to find its own structure in unlabeled example inputs. In one embodiment, machine learning techniques may be used to determine user preferences and detect traffic light patterns.

Based upon these analyses, the processing element may learn how to identify characteristics and patterns that may then be applied to analyzing image data, model data, and/or other data. For example, the processing element may learn, to identify trends of traffic based on traffic light timing and vehicle types at an intersection. The processing element may also learn how to identify trends that may not be readily apparent based upon collected traffic data, such as trends that identify intersection types and/or determine courses of actions for the vehicle to perform at the intersection.

The exemplary systems and methods described and illustrated herein therefore significantly increase the safety of operation of autonomous and semi-autonomous vehicles by reducing the potential for damage to the vehicles and the vehicle's surroundings.

The present systems and methods are further advantageous over conventional techniques the embodiments herein are not confined to a single type of vehicle and/or situation but may instead allow for versatile operation within multiple different types of vehicles, including ground craft, watercraft, aircraft, and spacecraft. Accordingly, these novel techniques are of particular value to vehicle manufacturers who desire to have these methods and systems available for the users of their vehicles.

Exemplary embodiments of systems and methods for securely navigating intersections are described above in detail. The systems and methods of this disclosure though, are not limited to only the specific embodiments described herein, but rather, the components and/or steps of their implementation may be utilized independently and separately from other components and/or steps described herein.

Although specific features of various embodiments may be shown in some drawings and not in others, this is for convenience only. In accordance with the principles of the systems and methods described herein, any feature of a drawing may be referenced or claimed in combination with any feature of any other drawing.

Some embodiments involve the use of one or more electronic or computer devices. Such devices typically include a processor, processing device, or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a programmable logic unit (PLU), a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the term processor and processing device.

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

We claim:

1. A vehicle comprising:
a plurality of sensors including at least one first sensor and at least one second sensor; and
a vehicle controller programmed to:
collect first sensor information from at least the at least one first sensor during operation of a vehicle;
execute an intersection classification AI model based upon the first sensor information to determine a type of intersection that the vehicle is approaching;
collect second sensor information from at least the at least one second sensor during vehicle operation;
execute an intersection specific AI model based upon the second sensor information to determine at least one course of action for the vehicle to execute, wherein the intersection specific model is associated with the type of intersection determined by the intersection classification model; and
control the vehicle according to the at least one course of action determined by the intersection specific AI model.

2. The vehicle of claim 1, wherein the vehicle controller is further programmed to:
train the intersection classification model using a plurality of historic intersection records for historic intersections associated with a type of intersection, wherein each historic intersection record includes i) an identification of the type of intersection of the historic intersection, and ii) historic sensor data associated with the historic intersection.

3. The vehicle of claim 1, wherein the vehicle controller is further programmed to:

train one or more intersection specific models using a subset of a plurality of historic vehicle records for historic intersections having identical intersection types, wherein each historic vehicle record includes i) historic courses of action of the vehicle, and ii) historic sensor data of a historic intersection associated with the same intersection type.

4. The vehicle of claim 2, wherein the second sensor includes at least one of a radar, a LIDAR, a proximity sensor, an ultrasonic sensor, an electromagnetic sensor, a wide RADAR, a long-distance RADAR, a Global Positioning System (GPS), a video device, an imaging device, a camera, an audio recorder, and a computer vision.

5. The vehicle of claim 1, wherein the vehicle controller is further programmed to:
apply the first sensor information to the intersection classification model to determine the type of intersection, wherein the intersection type includes at least one intersection designation including: a) a four-way; b) a Y-intersection; c) a T-intersection; d) a traffic circle; e) a fork; f) a designated turning lane; g) no turning lane; h) a controlled intersection; i) an uncontrolled intersection; j) a pedestrian crosswalk; and/or k) no pedestrian crosswalk.

6. The vehicle of claim 2, wherein the vehicle controller is further programmed to:
apply the second sensor information to the intersection specific model to determine at least one course of action for the vehicle including at least one of i) braking, ii) accelerating, and iii) maneuvering controls.

7. A system for controlling a vehicle, wherein the system comprises:
a computer device comprising:
at least one memory; and
at least one processor in communication with the at least one memory, the at least one processor programmed to:
collect first sensor information from at least one first sensor during operation of a vehicle;
execute an intersection classification AI model based upon the first sensor information to determine a type of intersection that the vehicle is approaching;
collect second sensor information from at least one second sensor during vehicle operation;
execute an intersection specific AI model based upon the second sensor information to determine at least one course of action for the vehicle to execute, wherein the intersection specific model is associated with the type of intersection determined by the intersection classification model; and
control the vehicle according to the at least one course of action determined by the intersection specific AI model.

8. The system of claim 7, the at least one processor further programmed to:
train the intersection classification model using a plurality of historic intersection records for historic intersections associated with a type of intersection, wherein each historic intersection record includes i) an identification of the type of intersection of the historic intersection, and ii) historic sensor data associated with the historic intersection.

9. The system of claim 7, the at least one processor further programmed to:
train one or more intersection specific models using a subset of a plurality of historic vehicle records for historic intersections having identical intersection types, wherein each historic vehicle record includes i)

historic courses of action of the vehicle, and ii) historic sensor data of a historic intersection associated with the same intersection type.

10. The system of claim 7, wherein the second sensor includes at least one of a radar, a LIDAR, a proximity sensor, an ultrasonic sensor, an electromagnetic sensor, a wide RADAR, a long-distance RADAR, a Global Positioning System (GPS), a video device, an imaging device, a camera, an audio recorder, and a computer vision.

11. The system of claim 7, the at least one processor further programmed to:

apply the first sensor information to the intersection classification model to determine the type of intersection, wherein the intersection type includes at least one intersection classification including: a) a four-way; b) a Y-intersection; c) a T-intersection; d) a traffic circle; e) a fork; f) a designated turning lane; g) no turning lane; h) a controlled intersection; i) an uncontrolled intersection; j) a pedestrian crosswalk; and/or k) no pedestrian crosswalk.

12. The system of claim 7, the at least one processor further programmed to:

apply the second sensor information to the intersection specific model to determine at least one course of action for the vehicle including at least one of i) braking, ii) accelerating, and iii) maneuvering controls.

13. A method for controlling a vehicle using a vehicle controller associated with the vehicle, the method comprising:

collecting first sensor information from at least one first sensor during operation of a vehicle;

executing an intersection classification AI model based upon the first sensor information to determine a type of intersection that the vehicle is approaching;

collecting second sensor information from at least one second sensor during vehicle operation;

executing an intersection specific AI model based upon the second sensor information to determine at least one course of action for the vehicle to execute, wherein the intersection specific model is associated with the type of intersection type determined by the intersection classification model; and controlling the vehicle according to the at least one course of action determined by the intersection specific AI model.

14. The method of claim 13, wherein the method further includes at least one of:

training the intersection classification model using a plurality of historic intersection records for historic intersections associated with a type of intersection, wherein each historic intersection record includes i) an identification of the type of intersection of the historic intersection, and ii) historic sensor data associated with the historic intersection and updating the intersection classification model using a plurality of historic intersection records associated with a type of intersection.

15. The method of claim 13, wherein the method further includes at least one of:

training at least one intersection specific model using a subset of a plurality of historic vehicle records for historic intersections having identical intersection types, wherein each historic vehicle record includes i) historic courses of action of the vehicle, and ii) historic sensor data of a historic intersection associated with the same intersection type; and updating at least one intersection specific model associated with an intersection type using a plurality of historic vehicle records associated with vehicle interactions at the type of intersection.

16. The method of claim 13, wherein the second sensor includes at least one of a radar, a LIDAR, a proximity sensor, an ultrasonic sensor, an electromagnetic sensor, a wide RADAR, a long-distance RADAR, a Global Positioning System (GPS), a video device, an imaging device, a camera, an audio recorder, and a computer vision.

17. The method of claim 13, wherein the method further includes:

applying the first sensor information to the intersection classification model to determine the type of intersection, wherein the intersection type includes at least one intersection classification including: a) a four-way; b) a Y-intersection; c) a T-intersection; d) a traffic circle; e) a fork; f) a designated turning lane; g) no turning lane; h) a controlled intersection; i) an uncontrolled intersection; j) a pedestrian crosswalk; and/or k) no pedestrian crosswalk.

* * * * *